United States Patent Office 2,726,232
Patented Dec. 6, 1955

2,726,232

P-XYLYLENE BIS (5 CYCLOPENTADIENE) AND POLYMER

Robert W. Upson, Fair Haven, N. J., assignor to E. I. du Pont de Nemours and Company, Wilmington, Del., a corporation of Delaware No Drawing. Application February 6, 1953, Serial No. 335,589

2 Claims. (Cl. 260—93.1)

This invention relates to new organic compounds. More particularly, it relates to new unsaturated carbocyclic compounds and their polymers, and to methods for their preparation.

This invention has as an object the preparation of of new organic compounds containing cyclopentadiene nuclei. Another object is the preparation of polymers of these cyclopentadiene nuclei-containing compounds. Other objects will appear hereinafter.

These objects are accomplished by the present invention, one aspect of which comprises p-xylylene-bis-(5-cyclopentadiene). Another phase of the present invention is that of polymers obtained by a Diels-Alder reaction, by vinyl addition polymerization, and by air-drying of the monomeric p-xylylene-bis-(5-cyclopentadiene). The polymers of this invention vary from soft, thermosetting polymers soluble in organic solvents to hard, infusible and insoluble polymers, depending on the polymerization conditions employed.

The monomeric p-xylylene-bis-(5-cyclopentadiene) of this invention can be prepared by bringing a metallic derivative of cyclopentadiene, i. e., 5-cyclopentadienyl-potassium or 5-cyclopentadienyl-magnesium bromide in contact with p-xylylene dibromide, dichloride, or diiodide under anhydrous conditions. Preferably the reaction is carried out at low or moderately elevated temperatures in the presence of an inert solvent, i. e., one which does not react with the organometallic derivative of cyclopentadiene or with the dihalide, e. g., hydrocarbons such as benzene and decane, ethers such as diethyl ether and dimethoxyethane, and tertiary amides such as dimethylformamide. Reaction temperatures less than 150° C. are operable, although temperatures between about 10° and 70° C. give best results. In general, the use of higher temperatures causes more rapid reaction rates but at these higher temperatures appreciable Diels-Alder coupling of the monomeric product takes place. Therefore, if best yields of monomer are desired, it is perferred to operate at the lower temperatures.

Certain types of solvents have catalytic activity in the reaction of the organometallic derivative of cyclopentadiene with the dihalide. Dimethoxyethane and dimethylformamide have this property of catalyzing the reaction. Consequently, the use of such solvent-catalysts is especially desirable to accelerate the formation of the monomeric bis-cyclopentadienes at low reaction temperatures where Diels-Alder addition of the monomer is minimized.

The time required for reaction of the cyclopentadiene organometallic compound with the dihalide is dependent on several factors, including the reaction temperature, the particular cyclopentadiene metallic compound, and the particular dihalide being used. In general, the time and temperature are inversely proportional. That is, at lower reaction temperatures longer reaction times are required. For example, in the reaction of cyclopentadienyl-potassium with p-xylylene dibromide a reaction time of one hour is sufficient at a reaction temperature of 25° C., while at reaction temperatures of 10° to 20° C. three hours are required. With cyclopentadienyllithium the reaction time at any given temperature is longer than with the corresponding potassium compound.

As indicated previously, the reaction must be carried out under anhydrous conditions because of the great reactivity of the organometallic cyclopentadiene compounds with water. It is not essential to carry out the reaction in the absence of oxygen. However, since the bis-cyclopentadienes of this invention react very readily with oxygen, it is preferred to carry out the reaction in an inert atmosphere, e. g., in the presence of nitrogen, to prevent air drying of the product. In some cases it is desirable to add to the reaction mixture a small amount of an antioxidant, e. g., 0.5 to 1.0%, based on the weight of the cyclopentadiene compound, of phenyl-$\beta$-naphthylamine, to inhibit reaction with oxygen.

The monomeric p-xylylene-bis-(5-cyclopentadiene) of this invention is isolated from the reaction mixture by conventional methods. For example, after separation from by-product salts, the liquid reaction mixture can be subjected to low-temperature distillation to remove volatile solvents and the monomeric p-xylylene-bis-(5-cyclopentadiene) then fractionally distilled. In some cases it is desirable to add a vinyl polymerization inhibitor, e. g., phenothiazine, to prevent addition polymerization of the monomer during distillation.

The monomeric p-xylylene-bis-(5-cyclopentadiene) of this invention is readily polymerized by a Diels-Alder reaction in which the conjugated diene group of one cyclopentadiene structure adds to another cyclopentadiene unit acting as the dienophile. This polymerization takes place at room temperature and in an inert atmosphere. This type of polymerization is illustrated by the following equation:

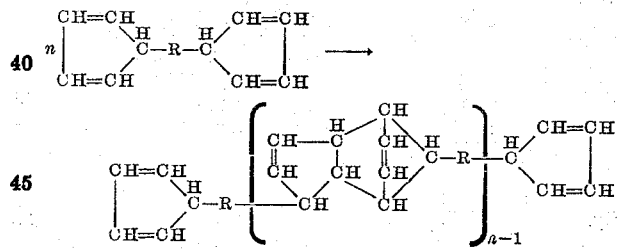

wherein R is a p-xylylene radical. This type of polymerization can be carried out either by bulk, solution, or emulsion techniques. The polymers obtained range from soft, soluble, fusible products to hard, insoluble, infusible polymers, depending on the particular conditions of polymerization used. Reaction temperatures ranging from about 25° C. to about 400° C. can be used. While insoluble, infusible polymers are usually obtained by bulk polymerization of p-xylylene bis-(5-cyclopentadiene), soluble and fusible polymers can be obtained under some conditions, e. g., if short reaction times are used or if oxygen is excluded from the reaction system. In these polymerizations the reaction time is inversely proportional to the temperature being employed. Polymers prepared at the highest temperatures in the above-mentioned range are quite dark in color. Consequently, reaction temperatures of 25° to 200° C. are preferred for polymerizations involving Diels-Alder addition.

Polymers which soften at temperatures between 25° and 300° C., and which are thermosetting can be prepared by Diels-Alder addition in solution or emulsion. These two modifications provide better control of the rate and degree of polymerization than is possible in bulk polymerization, and are therefore preferred. In the solution and emulsion processes, polymerization temperatures of 25° to 250° C. are generally operable. Temperatures of less than 100° C. are preferred when fusible polymers are desired. In solution polymerizations, solvents such as benzene, hexane, decane, cyclohexane, ether, chlorobenzene, nitrobenzene, xylene, toluene, carbon tetrachloride, and chloroform are operable. Additives such as acetic acid, halogenoacetic acids, phenol and triethylamine are sometimes included to promote the Diels-Alder addition.

Fusible p-xylylene-bis-(5-cyclopentadiene) polymers obtained by controlled Diels-Alder addition are readily converted to infusible polymers by heating at temperatures of 50° to 300° C. for relatively short times.

The p-xylylene-bis-(5-cyclopentadiene) of this invention can also be copolymerized with other bis-dienophiles. Examples of such comonomers include p-quinone, N,N'-(1,3-phenylene)bis-maleimide, conjugated dienes in general, including substituted butadienes, and different biscyclopentadienes.

In addition to polymerization by Diels-Alder addition, the p-xylylene-bis-(5-cyclopentadiene) of this invention is also capable of undergoing vinyl-type addition polymerization to yield both soluble, fusible polymers and insoluble, infusible polymers. The addition polymerization of p-xylylene-bis-(5-cyclopentadiene) monomer can be initiated by either free radical-generating or ionic initiators. Suitable ionic initiators include boron trifluoride, aluminum chloride, and the like. Suitable free radical generating initiators include hydrogen peroxide, benzoyl peroxide, ammonium persulfate, $\alpha,\alpha'$-azodiisobutyronitrile, 1,1'-azodicyclohexanecarbonitrile, and the like. The polymerizations can be carried out by bulk, solution, and emulsion techniques. Preferably the polymerization is carried out in the absence of oxygen in order to prevent polymerization by reaction with oxygen. Thus, the polymerization can be carried out in an inert atmosphere, e. g., in the presence of nitrogen. The polymerization can be carried out at widely varying temperatures, the actual temperature used in any specific case being dependent on the particular type of initiator being employed. Temperatures ranging from $-80°$ to 25° C. are operable with ionic initiators such as boron trifluoride-etherate. With free radical-generating initiators temperatures ranging from 0° to 150° C. can be used. The actual temperature in any case is dependent on the particular free radical-generating initiator being used. The temperature selected in this case should be that at which the initiator generates free radicals readily.

As in the case of polymerization by Diels-Alder addition, the p-xylylene-bis-(5-cyclopentadiene) can be polymerized by vinyl-type addition polymerization alone, or in combination with other unsaturated compounds capable of undergoing vinyl polymerization. Examples of operable unsaturated monomers include dienes, e. g., butadiene, chloroprene and isoprene; vinyl monomers including vinyl acetate, methyl methacrylate, styrene, acrylonitrile, ethylene, vinyl chloride, vinyl fluoride, vinyl ethers, acrylic acids and amides, maleic anhydride, fumaric esters, etc.

The p-xylylene-bis-(5-cyclopentadiene) of this invention also undergoes air-drying at ordinary and elevated temperatures to hard, insoluble and infusible polymers which are especially useful as coating compositions. These air-dried polymers contain, on the basis of infrared absorption spectra, carbonyl and hydroxyl groups. The p-xylylene-bis-(5-cyclopentadiene) of this invention is capable of air drying to hard, insoluble and infusible polymers in 24 hours at room temperature in the air. However, the rate of drying can be accelerated by the use of common metallic driers, e. g., cobalt naphthenate, and by the use of peroxides, e. g., benzoyl peroxide.

The following examples in which parts are by weight are illustrative of the invention.

Example I

Cyclopentadienylpotassium is prepared by reacting 40.0 parts of cyclopentadiene in 145 parts of anhydrous benzene with 20.0 parts of finely divided potassium in 308 parts of anhydrous benzene. The reaction is carried out under a blanket of nitrogen, and the cyclopentadiene is added dropwise to the potassium over a period of two hours. During this time the reaction temperature is maintained between 15° and 20° C. by external cooling. An additional 264 parts of anhydrous benzene is then added and the mixture stirred for 1.3 hours at 25° C.

Example II

Cyclopentadienylpotassium is prepared from 16.2 parts of potassium and 29.6 parts of cyclopentadiene as described in Example I. A solution containing 50 parts of p-xylylene dibromide, 176 parts of anhydrous benzene, and 258 parts of 1,2-dimethoxyethane is added dropwise to the cyclopentadienylpotassium suspension over a period of two hours at 15° to 20° C. A clear solution is formed which is stirred under nitrogen for an additional 1.5 hours at 15° to 20° C. During this time potassium bromide precipitates from the reaction solution. Phenyl-$\beta$-naphthylamine, 0.1 part, is added as an antioxidant, and the reaction mixture is filtered. Concentration of the filtrate under reduced pressure at 0° to 10° C. gives 26 parts of liquid p-xylylenebiscyclopentadiene which corresponds to 59% of the theoretical yield. The product is soluble in benzene, methanol, ethanol, acetone, diethyl ether, n-hexane, carbon tetrachloride, and chloroform. It does not crystallize at temperatures down to $-78°$ C. It polymerizes on attempted distillation at 35° to 50° C. under 1 to 2 mm. pressure.

*Analysis.*—Calculated for $C_{18}H_{18}$: C, 92.3%; H, 7.7%; mol. wt., 234. Found: C, 90.6%; H, 7.5%; mol. wt., 500.

These analytical data indicate that the product is a low polymer containing two to three p-xylylenebiscyclopentadiene units.

Example III

A solution containing 1.0 part of p-xylylenebiscyclopentadiene (prepared as described in Example II), 1.0 part of benzene and 0.01 part of cobalt naphthenate is evaporated at 25° C. After two to three hours a tack-free film is formed and after 20 hours the film is extremely hard. The film does not soften at temperatures up to 360° C. and is insoluble in phenol, dimethylformamide, and in benzene. Infrared absorption spectra indicate that the polymer contains some carbonyl and hydroxyl groups in addition to dicyclopentadiene linkages.

Example IV

A solution containing 1.0 part of p-xylylenebiscyclopentadiene (prepared as described in Example II), and 0.02 part of phenyl-$\beta$-naphthylamine is emulsified at room temperature in a solution containing 10 parts of water, 0.2 part of sodium dodecylsulfate and 0.2 part of a dispersing agent containing about 50% of a sodium alkyl sulfinate. The emulsion is agitated under nitrogen for 72 hours at room temperature (about 25° C.) during which time a hard polymer separates from the emulsion. The polymer is washed with water and methanol and then dried. The resulting polymer softens at 150° C. and is insoluble in phenol, dimethylformamide, and benzene. Smooth, transparent films are obtained by pressing the polymer at 200° C. under 2000 lbs. pressure for one minute. Films prepared in this manner are infusible at temperatures up to 360° C. A typical film has the following electrical properties:

Dielectric constant (1000 cycles) _____ 3.3
Power factor (1000 cycles) _____ 0.0075
Volume resistivity _____ $1.8 \times 10^{11}$ ohm-cm.

Example V

Another polymer of p-xylylenebiscyclopentadiene prepared by emulsion polymerization as described in Example IV except that it was polymerized for only 27 hours at room temperature softens at 80–90° C. A bar molded from this polymer at 80° C. and thermoset by heating for 45 minutes at 100–150° C. has the following properties:

| | |
|---|---|
| Softening temperature_____° C__ | >360 |
| Solubility in organic solvents_____ | Insoluble |
| Density (25° C.)_____ | 1.1172 |
| Water absorption (192 hrs. at 25° C.)___percent__ | 0.2 |
| Acid resistance (3% $H_2SO_4$): | Per cent gain in weight |
| 170 hrs. at 25° C. (excellent)_____ | 0.12 |
| 48 hrs. at 100° C. (excellent)_____ | 0.40 |
| Alkali resistance (1% NaOH): | |
| 170 hrs. at 25° C. (excellent)_____ | 0.05 |
| 48 hrs. at 100° C. (excellent)_____ | 0.35 |
| Water resistance: 48 hrs. at 100° C. (excellent)____ | 0.53 |
| Flexural modulus: | Lbs./sq. in. |
| 25° C_____ | 400,000 |
| 55° C_____ | 348,000 |
| 72° C_____ | 289,000 |

*Example VI*

A solution containing 1.0 part of p-xylylenebiscyclopentadiene (prepared as described in Example II), 0.01 part of phenothiazine, and 0.01 part of phenyl-β-naphthylamine is heated under nitrogen in a closed vessel for 48 hours at 100° C. An extremely hard polymer is formed. This polymer is insoluble in benzene, ethanol, acetone, chloroform, dimethylformamide, and phenol, and does not soften at temperatures up to 360° C. Infrared absorption spectra indicate that this polymer contains dicyclopentadiene linkages but no carbonyl or hydroxyl groups.

*Example VII*

A solution containing 1.0 part of p-xylylenebiscyclopentadiene (prepared as described in Example II), 1.2 parts of benzene, and 0.02 part of α,α'-azobis(α,γ-dimethylvaleronitrile) is heated for 72 hours at 60° C. A soft, solid vinyl addition polymer is formed that is insoluble in benzene and methanol. This polymer is infusible at temperatures up to 360° C.

*Example VIII*

A solution conting 1.0 part of p-xylylenebiscyclopentadiene (prepared as described in Example II) and 2.0 parts of methylene chloride is cooled for five minutes in a bath containing solid carbon dioxide and methanol and 2 drops of boron trifluoride-etherate is added. The reaction solution becomes viscous within two minutes after the catalyst is added. The temperature is raised to 25° C. and the polymerization continued for two hours. A hard, granular, vinyl addition polymer is formed which is insoluble in benzene and methanol and which does not soften at temperatures up to 360° C.

*Example IX*

A solution containing 2.0 parts of p-xylylenebiscyclopentadiene (prepared as described in Example II), 2.3 parts of N,N'-(1,3-phenylene)bismaleimide, and 0.02 part of phenyl-β-naphthylamine is heated in a closed vessel under nitrogen for 48 hours at 200° C. A brittle, hard copolymer is formed by a Diels-Alder addition which is then washed with hot benzene and methanol and dried. The copolymer does not soften at temperatures up to 360° C. Analyses indicate that the copolymer contains 15.6 N,N'-(1,3-phenylene)bismaleimide residues for each p-xylylenebiscyclopentadiene residue.

*Example X*

2-butenylenebiscyclopentadiene is prepared by reacting 25 parts of 1,4-dichloro-2-butene with the cyclopentadienylpotassium prepared from 16.6 parts of potassium and 32.6 parts of cyclopentadiene by the procedure described in Example II. The product, isolated as described in Example II, amounts to 22 parts, which corresponds to a 60% of theoretical yield of 2-butenylenebiscyclopentadiene. Distillation of this compound through a precision column gives a colorless liquid, B. P. 26° C./1.2 mm.; $n_D^{25}$=1.5258.

*Analysis.*—Calculated for $C_{14}H_{16}$: C, 91.3%; H, 8.7%; mol. wt., 184. Found: C, 90.4%; H, 8.6%; mol. wt., 155.

*Example XI*

Cyclopentadienylmagnesium bromide is prepared by reacting 33.0 parts of cyclopentadiene in 33 parts of anhydrous benzene with 67.0 parts of ethylmagnesium bromide in 55 parts of anhydrous benzene and 89 parts of diethyl ether at a temperature of 60° C. The reaction solution is refluxed for 20 minutes after all the ethylmagnesium bromide is added.

A solution containing 25 parts of 1,4-dichloro-2-butene in 25 parts of 1,2-dimethoxyethane is added to the Grignard solution prepared as described in the preceding paragraph over a period of 1.1 hours. The temperature of the reaction solution rises from 33° to 50° C. during this time. After all the 1,4-dichloro-2-butene is added, the reaction solution is stirred under nitrogen for 1.5 hours during which time the temperature decreases to 25° C. The reaction mixture is filtered and the residue is washed with 176 parts of anhydrous benzene. The combined filtrates are washed four times with 100-part portions of water and dried over anhydrous calcium sulfate. The filtrate is then concentrated at 0° to 10° C. under 10–20 mm. pressure. The residue amounts to 31 parts, corresponding to 85% of the theoretical, of 2-butenylenebiscyclopentadiene.

*Example XII*

A solution containing 2.4 parts of p-xylylenebiscyclopentadiene (prepared as described in Example II), 1.9 parts of 2-butenylenebiscyclopentadiene (prepared as described in Example X), and 0.04 part of phenyl-β-naphthylamine is heated under nitrogen in a closed vessel for 48 hours at 240° C. A hard, glass-like copolymer is formed by a Diels-Alder addition. This polymer is washed with hot benzene and methanol and then dried. It is insoluble in phenol, dimethylformamide, benzene, and methanol, and does not soften at temperatures up to 360° C.

In the preparation of the products of this invention a p-xylylene chloride, bromide, or iodide is reacted with a cyclopentadienyl organometallic compound having the cyclopentadienyl radical joined to an alkali forming metal including the alkali metal cyclopentadienyls, e. g., cyclopentadienyllithium, -sodium, and -potassium, as well as cyclopentadienylmagnesium halides generically, e. g., cyclopentadienylmagnesium- chloride, -bromide, and -iodide. The alkali metal cyclopentadienyls can be prepared by known methods. Thus, cyclopentadienylpotassium is made by reaction of cyclopentadiene with potassium metal under anhydrous conditions in an inert solvent, e. g., benzene. The cyclopentadienyl Grignard reagents are made by reacting cyclopentadiene with an alkyl magnesium halide, e. g., methylmagnesium iodide, methylmagnesium bromide, and higher alkylmagnesium halides. Since the alkyl group of the organometallic compound merely forms a by-product hydrocarbon, it is preferred to use the cheapest and most readily available compounds of this type as reactants.

The products of this invention possess a variety of properties which make them of value for various applications. The monomeric p-xylene-bis-(5-cyclopentadiene) is of use as a chemical intermediate because of its reactivity. It is of particular value as a monomer for the preparation of valuable homopolymers and copolymers with other polymerizable materials. The polymeric bis-cyclopentadienes are especially useful as finishes, coating compositions, and laminating resins because of their thermosetting nature and because of the chemical inertness, insolubility in organic solvents, and infusibility of the thermoset product. The polymeric bis-cyclopentadienes are also useful as modifiers for other synthetic resins, e. g., for polystyrene, polymethyl methacrylate, and polychloroprene.

The foregoing detailed description has been given for clearness of understanding only and no unnecessary limitations are to be understood therefrom. The invention is not limited to the exact details shown and described for obvious modifications will occur to those skilled in the art.

What is claimed is:
1. p-Xylylene-bis-(5-cyclopentadiene).
2. A polymer of p-xylylene-bis-(5-cyclopentadiene).

References Cited in the file of this patent
UNITED STATES PATENTS 2,512,698    Thompson _____ June 27, 1950

OTHER REFERENCES

Whitmore: "Organic Chemistry," page 639, Van Nostrand (1937).